UNITED STATES PATENT OFFICE.

FERDINAND G. WIECHMANN, OF NEW YORK, N. Y.

MEANS FOR AND PROCESS OF SUGAR REFINING AND FILTERING, CLARIFYING, AND PURIFYING SUGAR-LIQUORS, &c.

SPECIFICATION forming part of Letters Patent No. 343,287, dated June 8, 1886.

Application filed December 26, 1885. Serial No. 186,799. (Specimens.)

*To all whom it may concern:*

Be it known that I, FERDINAND GERHARD WIECHMANN, a citizen of the United States, residing in the city, county, and State of New York, have invented a certain new and useful Improvement in the Means for and Process of Sugar-Refining, and of Filtering, Clarifying, and Purifying Sugar-Liquors, Sirups, and Saccharine Juices, which, according to my knowledge and belief, has not been patented in any other country or countries, and which has not been in public use in the United States for more than two years prior to this application; and I do hereby declare that the following is a full, clear, and exact description of my invention, which will enable others skilled in the art or process to which it appertains to make and use the same.

In the ordinary process of refining sugars the raw sugar is dissolved in water and filtered through filter-bags to remove some of the mechanically-suspended impurities, then refiltered through bone-black or some other suitable substance, in order that the solution may be further purified and decolorized, after which the solution is boiled down in suitable contrivances for the production of the refined sugar; but the operation of freeing sugar-liquors, sirups, and saccharine juices from their organic and mechanically-suspended impurities has always heretofore been attended with considerable difficulty, because in many sugars there is a cloudiness or turbidity, seemingly due to the presence of bacteria in the solution, which the ordinary process of filtration fails to remove unless the operation is several times repeated, which of course involves a larger outlay of time, labor, and money. The removal of this cloudiness or turbidity I accomplish in a simple, effective, and inexpensive way by my invention, which consists in the use of finely-powdered diatomaceous earth, also called "infusorial earth," or of finely-powdered quartz, in either of two ways, as follows:

First. From one per cent. to six per cent. of pulverized diatomaceous earth, or of quartz calculated on the amount of "dry substance" contained in the solution is stirred into and intimately mixed with the sugar-liquor, sirup, or saccharine juices in suitable vessels before filtration. After adding and intermixing the diatomaceous earth or the pulverized quartz, as described, the main portion of it may be allowed to settle, and the supernatant liquor should then be drawn off and filtered through filter-bags, filter-presses, or similar devices, or the liquor may be run through the filter-bags, filter-presses, or similar devices before the added diatomaceous earth or quartz has settled.

Second. The sugar-liquor, sirup, or saccharine juice may be filtered through a layer of the diatomaceous earth or powdered quartz contained in a suitable vessel and afterward treated in the usual manner.

The first method of procedure is on many accounts preferable; but in either case the filtrate from the filter-bags, filter-presses, or other devices commonly employed will run through and remain perfectly clear and bright; and the result of subjecting the sugar-liquor, sirup, or saccharine juice to the action of diatomaceous earth or quartz, as described, is not only to insure the absolute removal of the cloudiness or turbidity in the filtrates, but to materially hasten the ordinary process of filtration, provided the requisite proportion of the diatomaceous earth or powdered quartz is added. The diatomaceous earth or quartz can after having been used be reclaimed and used over again indefinitely by washing it with water or by subjecting it to the process of ignition. The ignition can be carried on in suitably-constructed kilns or ovens, and the gaseous products of the combustion of the organic impurities with which the diatomaceous earth will become charged can be caught and utilized as fuel, and thus the practical utilization of the organic impurities, heretofore a drag on the hands of the refiner, is made possible.

Having fully described my invention, what I claim, and desire to secure by Letters Patent, is—

1. The process of clarifying sugar-liquors, sirups, and saccharine juices by subjecting them to the action of finely-powdered diatomaceous earth or finely-powdered quartz, substantially as described.

2. The process of the filtration of sugar-liquors, sirups, or saccharine juices through or over a layer of finely-powdered diatomaceous earth or finely-powdered quartz, substantially as described.

3. As a new filtering medium and as a new agent for removing cloudiness, turbidity, and the impurities in sugar-liquors, sirups, and saccharine juices, powdered diatomaceous earth and powdered quartz, substantially as described.

4. The regeneration of the powdered diatomaceous earth and powdered quartz by washing, or by ignition, or by both.

FERDINAND G. WIECHMANN.

Witnesses:
JOSEPH B. BRAMAN,
A. HOWARD VAN LINDEREU.

Corrections in Letters Patent No. 343,287.

It is hereby certified that in Letters Patent No. 343,287, granted June 8, 1886, upon the application of Ferdinand G. Wiechmann, of New York, New York, for an improvement in "Means for and Process of Sugar Refining and Filtering, Clarifying and Purifying Sugar-Liquors, &c.," errors appear in the printed specification requiring correction, as follows: In line 47, page 1, the word *pulverized* should be inserted before the word "quartz," and the name of one of the witnesses to the patentee's signature to the specification on page 2 should have been printed *A. Howard Van Sinderen*, instead of "A. Howard Van Lindereu;" and that the Letters Patent should be read with these corrections therein that the same may conform to the record of the case in the Patent Office.

Signed, countersigned, and sealed this 29th day of June, A. D. 1886.

[SEAL.]
D. L. HAWKINS,
*Acting Secretary of the Interior.*

Countersigned:
M. V. MONTGOMERY,
*Commissioner of Patents.*